US005211897A

United States Patent [19]

Albertelli et al.

[11] Patent Number: 5,211,897

[45] Date of Patent: May 18, 1993

[54] SHAPING BODIES

[75] Inventors: Aldino Albertelli, London; Brian F. Pegg, Amersham, both of England

[73] Assignee: Company "A" Foam Limited, Slough, England

[21] Appl. No.: 557,849

[22] Filed: Jul. 26, 1990

[30] Foreign Application Priority Data

Jul. 28, 1989 [GB] United Kingdom ................. 8917324

[51] Int. Cl.[5] .............................................. B29C 67/20

[52] U.S. Cl. .................................... 264/134; 264/163; 264/321

[58] Field of Search ...................... 264/46.2, 163, 134, 264/321, 45.3

[56] References Cited

U.S. PATENT DOCUMENTS

| | | | |
|---|---|---|---|
| Re. 31,479 | 1/1984 | Lewis | 83/869 |
| 1,856,936 | 5/1932 | Turner . | |
| 2,141,566 | 12/1938 | Swenson . | |
| 2,739,093 | 3/1956 | Bull | 264/46.2 |
| 3,268,637 | 8/1966 | Cremer . | |
| 3,281,510 | 10/1966 | Lovret | 264/46.2 |
| 3,454,413 | 7/1969 | Miller | 264/321 |
| 3,610,078 | 10/1971 | Rowlands | 264/321 |
| 3,695,128 | 10/1972 | Gentile | 83/20 |
| 3,775,526 | 11/1973 | Gilmore | 264/163 |
| 3,881,980 | 5/1975 | Olson | 264/321 |
| 3,901,962 | 8/1975 | Kuchuris et al. | 264/321 |
| 3,939,741 | 2/1976 | Allan | 83/835 |
| 4,105,738 | 8/1978 | Rohn | 264/163 |
| 4,242,074 | 12/1980 | Lake | 264/163 |
| 4,278,482 | 7/1981 | Poteet et al. | 264/321 |
| 4,351,211 | 9/1982 | Azzolini | 83/861 |
| 4,485,295 | 11/1984 | Kellermeyer | 264/163 |
| 4,574,677 | 3/1986 | Huhne | 83/870 |
| 4,712,349 | 12/1987 | Riley et al. | 52/408 |
| 4,730,761 | 3/1988 | Spano | 83/451 |

FOREIGN PATENT DOCUMENTS

| | | | |
|---|---|---|---|
| 551994 | 1/1958 | Canada | 264/46.2 |
| 0010353 | 9/1979 | European Pat. Off. . | |
| 0056354 | 7/1982 | European Pat. Off. | 264/46.2 |
| 0082911 | 7/1983 | European Pat. Off. . | |
| 0239057 | 3/1987 | European Pat. Off. . | |
| 2411201 | 3/1974 | Fed. Rep. of Germany . | |
| 1595551 | 7/1970 | France | 264/163 |
| 47-051823 | 12/1972 | Japan | 264/46.2 |
| 58-016838 | 1/1983 | Japan | 264/46.2 |
| 24839 | of 1906 | United Kingdom . | |

OTHER PUBLICATIONS

Patent Abstracts of Japan, vol. 6, No. 10, (M-107)[888], Jan. 21, 1982.

*Primary Examiner*—Allan R. Kuhns
*Attorney, Agent, or Firm*—Browdy and Neimark

[57] ABSTRACT

A method of shaping a body, suitable for use in the building or furnishing industry, including: engaging a surface region of the body with a tool having a predetermined profile; effecting relative movement between the body and the tool in a direction generally parallel with a surface of said region, the body being formed of a material which is sufficiently friable as it is engaged by the tool during the relative movement to be removed but sufficiently rigid for adjacent material to remain attached, whereby said surface region is formed with a recess having a profile corresponding to the predetermined profile of the tool. The method is particularly suitable for profiling of plaster materials and rigid plastic foams such as phenolic foams.

10 Claims, 3 Drawing Sheets

SHAPING BODIES

BACKGROUND OF THE INVENTION

1. Field of the Invention

This invention relates to methods and apparatus for shaping materials, suitably materials for use in the building or furnishing industries.

2. Prior Art

In the building industry, many items conventionally made from wood, plaster, etc. are now made from plastics materials. Particularly important amongst these plastics materials are foamed plastics products, which are used as replacements for wood in the manufacture of doors and window surrounds and for plaster in the manufacture of ceiling tiles, cornices, etc.

Amongst the widely used foamed products are polystyrene and polyurethane foams, though these have the disadvantage of being combustible. Even when modified with flame retardants, they give off noxious poisonous fumes or dense smoke when exposed to flame and are a serious hazard in fire. For these reasons, there is a growing prejudice against their use, especially in private dwellings.

Foamed phenolic resins have also been available for many years and can be formulated so as not to support flame and to have a lower tendency than polystyrene or polyurethane foams to generate toxic fumes in the presence of flame. The basic material, i.e. the phenolic resin, is also relatively cheap. Nevertheless, hitherto they have not gained as wide acceptance in industry as polyurethane inter alia because of their generally poor physical strength; they tend to be brittle and friable and easily crushed. Further, while they can be manufactured as simple shapes such as slabs and blocks, they cannot readily be moulded to produce complex shapes. One reason for this is that their poor strength can create difficulties in removing the article from the mould. Thus, more complex shapes have to be produced from slabs or blocks by a further operation such as machining.

EP-A-0.010.353 discloses a method of forming a foamed phenolic resin composition by causing or allowing a mixture of phenolic resole, acid hardener and finely divided particulate solid to cure under conditions in which foaming of the mixture is caused primarily or solely by volatilisation of small molecules present in the resole or formed as a by-product of the curing reaction. The formation of such foams is described in detail in EP-A-0.101.353 and foamed bodies comprising these foams are obtainable as "ACELL" from Company 'A' Foam Limited of Addison Road, Chesham, Buckinghamshire, England. Preferably, the foam has a density in the range 100 to 500 kg/m$^3$, more preferably 150 to 400 kg/m$^3$ and most preferably 150 to 250 kg/m$^3$.

Foam produced by the method disclosed in EP-A-0.101.353 can have a fine texture of substantially uniform pore size, excellent fire resistance, high thermal insulation and good resistance to heat.

With conventional materials such as plaster mixes and the newer foamed plastics materials, considerable expense is incurred in producing desired decorative finishes on ceiling tiles, panels, etc. and in producing desired profiles for cornices, door moldings, etc. This is true whether the desired finish or profile is produced by casting in a suitable mould or by machining or stamping a moulded product.

It is therefore an object of the present invention to provide a method of shaping materials, suitably materials for use in the building or furnishing industry, which can be carried out quickly and cheaply and which readily allows a change from one profile to another to be effected during manufacture.

SUMMARY OF THE INVENTION

According to the present invention there is provided a method of shaping a body, suitably a body for use in the building or furnishing industry, comprising engaging a surface region of the body with a tool having a predetermined profile, and effecting relative movement between the body and the tool in a direction generally parallel with a surface of the said region, the body being formed of a material which is sufficiently friable for material which is engaged by the tool during the relative movement to be removed from the body but sufficiently rigid for adjacent material to remain attached, whereby the said surface region is formed with a recess having a profile corresponding to the predetermined profile of the tool.

It will be appreciated that materials suitable for use by a method according to the invention are generally "set" materials. Such materials may be resins which are at least partially cured, or plaster, which is in a set or dried condition e.g. as derived from a plaster mix comprising gypsum, water and sand, perlite or pumice.

A method according to the invention is particularly suitable for shaping porous bodies such as made of foamed plastics materials or foam glass.

In the case of porous materials, such as foamed plastics materials, it is believed that the action of the tool is to crumble individual cells which lie directly in the path of the tool and to break or snap-off cells at the edge of the path. Cells immediately adjacent the tool path are subject to less stress and the cell walls are sufficiently rigid for the cells to remain attached to the main body of the material. Particularly suitable foamed plastics materials are those based on phenolic resins, as disclosed in EP-A-0.010.353. However, the method can also be used with other foamed plastics materials such as rigid polyester foams, rigid polyurethane foams and other rigid phenolic foams. In each case, the requirement is that the friability and rigidity of the material result in a recess of the desired profile.

In carrying out a method according to the invention, the body is suitably supported on a conveyor, the tool is mounted above the conveyor, and the body is conveyed past the tool in such manner that an upper surface of the body is engaged by the tool and is formed with the predetermined profile.

The method may be carried out in a plurality of stages, there being a tool which engages the said surface of the body at each stage, and the depth of the profile formed in the surface increasing at each stage.

In at least the first stage, the tool may have a toothed profile, or the tool may be formed of a series of laterally spaced tool elements, each element being formed as a tooth, pin or the like.

The depth of the profile may be varied by effecting a relative movement between the tool and the body in a direction perpendicular to the said surface during the course of the relative movement in a direction generally parallel with the surface.

A method according to the invention may comprise effecting a first relative movement between the body and the tool in a direction generally parallel with the surface of the body, and then effecting a second relative movement between the body and the tool in a direction also generally parallel with the said surface but transverse to the first relative movement. This method is particularly suitable for shaping a body to form an item such as a panelled door.

Methods according to the invention are particularly suitable for shaping bodies which serve as components in the construction of suspended ceilings. Included in such components are decorative ceiling panels, support strips, bulkheads, margin pieces and cornices. Each of these components, and thus the whole of the ceiling which is visible from below, can thus be made from components of the same foamed plastics material.

BRIEF DESCRIPTION OF THE DRAWINGS

The invention will now be described, by way of example, with reference to the accompanying drawings, in which.

DETAILED DESCRIPTION OF THE INVENTION

Figure 1:
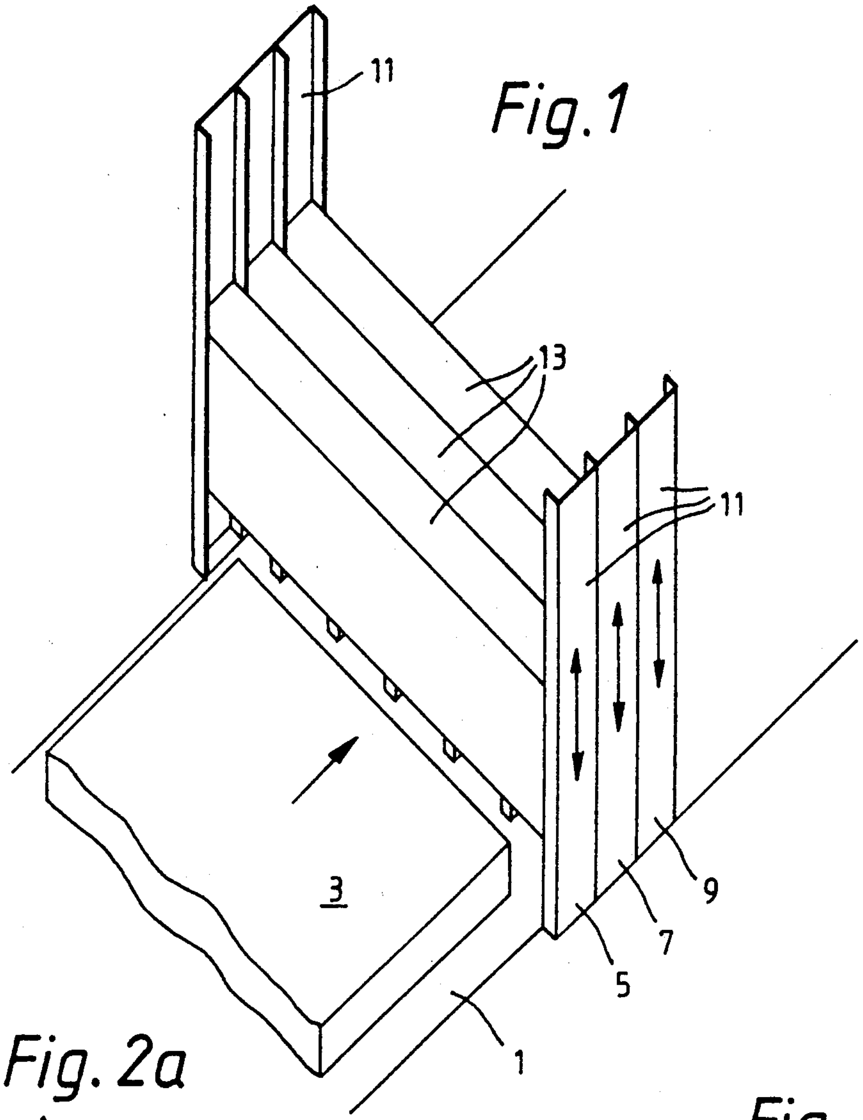
FIG. 1 is a schematic perspective view of a part of an apparatus for carrying out a method according to the invention.
Figure 2A:
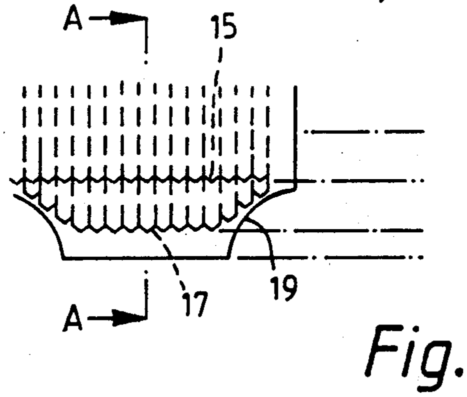
FIGS. 2(*a*) and (*b*) are schematic front and side elevations of tools included in the apparatus of FIG. 1.
Figure 2B:
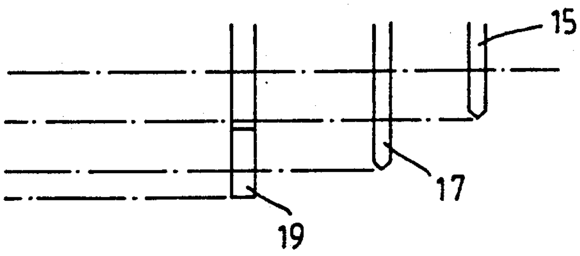

The apparatus shown in FIGS. 1 and 2 of the drawings is suitable for shaping sheets or blocks of foamed plastics materials, suitably to form decorative panels, support strips, cornices, etc. for suspended ceilings.

Referring to FIG. 1, the apparatus includes a conveyor 1 having a horizontal run for supporting a sheet 3 of plastics material. Three tool holders 5, 7 and 9 are provided at spaced locations along the horizontal run of the conveyor 1.

Each of the tool holders 5, 7 and 9 includes a pair of upstanding guides 11 which are disposed on respective opposite sides of the conveyor 1. A cross-member 13 is slidable upwardly and downwardly in each pair of guides 11, and supported by each cross-member is a series of tool elements which are equally spaced in a direction transversely of the conveyor 11.

Referring now to FIGS. 2(*a*) and (*b*), the cross-member 13 in the first tool holder 5 supports a series of tool elements 15 each of which has a lower serrated edge. Each tooth in the tool elements 15 is disposed at the same vertical location above an upper surface of the conveyor 1.

In the second tool holder 7 there is a series of tool elements 17 which are aligned with respective elements 15 and whose lower edges are likewise toothed. In the case of the elements 17, however, there is first a central section wherein each tooth is equally spaced above the conveyor 1, the spacing between these teeth and the conveyor being less than the spacing between the teeth of the tool elements 15 and the conveyor. At each side of each tool element 17 there are further teeth spaced by progressively increasing amounts from the conveyor 1.

Finally, the third tool holder 9 supports a series of tool elements 19 each of which has a lower edge whose profile corresponds to the desired profile for the upper surface of the sheet 3. As shown in FIG. 2(*a*), this profile includes a central section which is linear and horizontally extending and two outer sections, in each of which the lower edge of the element curves upwardly and outwardly.

An inlet to a vacuum pump is connected to each of the tool holders 5, 7 and 9 in the region of the lower edges of the tool elements 15, 17 and 19. When the pump is activated, material torn from the sheet 3 is removed from the vicinity of the tool elements.

Prior to using the present apparatus, the spacings between the lower edges of the tool element 15, 17 and 19 and the conveyor 1 are adjusted by moving each of the cross-members 13 in the associated guide 11. These adjustments are designed to suit the thickness of the sheet 3 and the depth of the recesses which are to be formed in the upper surface of the sheet.

The sheet 3 is then placed on the conveyor 1 and driven past the tool holders 5, 7 and 9, in the direction of the arrow in FIG. 1 of the drawings.

When a leading edge of the sheet 3 arrives at the first tool holder 5, an upper surface region of the sheet is engaged by the tool elements 15. Continued movement of the sheet, forcing the surface region past the elements 15, results in the material being torn away from the upper surface of the sheet 3, forming in that surface a series of longitudinally extending recesses each having a profile which is serrated, corresponding to the serrated profile of the lower edge of the element 15.

Upon reaching the second tool holder 7 the leading edge of the sheet 3 engages the tool elements 17, whose lower edges are of course closer to the conveyor 1. Accordingly, as the sheet moves past the tool holder 7 the existing recesses in the upper surface region of the sheet are converted to recesses which are deeper and which have profiles corresponding to the profile of each element 17.

Finally, as the sheet 3 is driven past the tool holder 19, recesses which are still deeper and which have profiles corresponding to the profile of the tool element 19 are formed in the upper surface region of the sheet 1.

Once the sheet 3 has emerged from the third tool holder 9, its upper surface region is formed with a series of longitudinally extending recesses. In most cases, the sheet is then rotated through 90° returned to its original position on the conveyor 1, and driven past the tool holders 5, 7 and 9 for a second time. This produces a second series of longitudinally extending recesses, each of which is perpendicular to each of the recesses in the first set.

Figure 3:
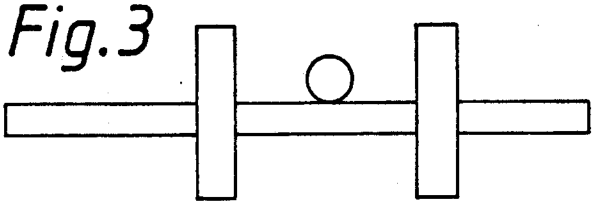
FIG. 3 is a schematic side elevation of a modification of the apparatus of FIG. 1.

The apparatus of FIG. 1 can be modified by including two sets of tool holders and associated tool elements, shown in FIG. 3. A roller 21 may be provided between the two sets of tool holders for the purpose described below.

In a further modification, the tool holders 5, 7 and 9 are provided with means for automatically varying the spacing between respective elements 15, 17 and 19 and the conveyor 1 during movement of the sheet 3. By this means, the depth of each recess can be varied. This facility is particularly useful in forming components such as panelled doors, enabling the formation of a series of individual recesses spaced apart in the direction of movement of the sheet.

The apparatus can be further modified by providing a conveyor which drives the sheet along a curved path rather than the linear path indicated in FIG. 1 of the drawings. This produces correspondingly curved recesses in the sheet 3 or, if the recesses are sufficiently deep, a curved component, such as a cornice.

Further profiling of the surface region of a body may be effected by embossing, e.g. using one or more rollers such as the roller 21 illustrated in FIG. 3. Such embossing may be effected before or after the body has been shaped by the method of the invention and may be achieved, for example, by use of one or more rollers having an embossed surface, and/or by means of a press.

In another preferred embodiment of the invention where the final profile of a surface of a body is achieved by a method according to the invention in a plurality of stages with the depth of the profiled recess being increased at each stage, e.g. as described above with reference to FIGS. 1 and 2, a coating, e.g. of paint, may be applied to the surface of the recess before the last stage, and preferably after the penultimate stage, and the profile of the tool employed in the last stage is designed so as to smooth and spread the coating as well as effect the final profiling of the recess. Alternatively, the coating may be applied after the final stage of profiling and the apparatus may include a further tool downstream of the final stage profiling tool, shaped to smooth the coating to a predetermined uniform depth.

It will be appreciated that the apparatus may include a plurality of tools, or of sets of tools, intended to produce different profiles on a surface of a body and means for lifting all but the chosen tool, or set of tools, out of contact with the surface, whereby a variety of different profiles can be formed using a single machine.

Figure 4:
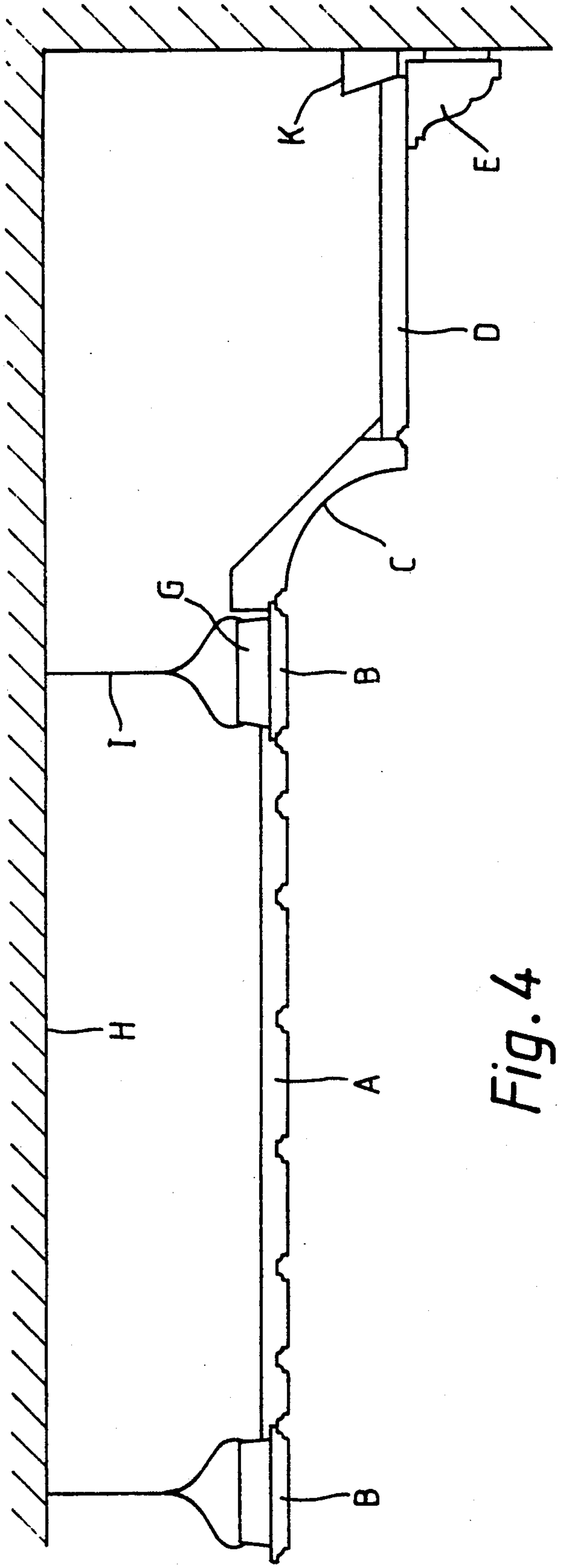
FIG. 4 is a section through a suspended ceiling made from components shaped in the apparatus of FIGS. 1 and 2.

FIG. 4 of the drawings shows a suspended ceiling containing a series of components A, B, C, D, E and F which have been shaped by the apparatus of FIG. 1. Each of these components is made from a foamed phenolic resin, in accordance with the method disclosed in EP-A-0-010.353.

As shown in FIG. 4, a central region of the present ceiling contains a series of rectangular ceiling panels A. Each of the panels is supported at a first pair of opposed edges by a pair of mutually spaced, parallel arranged support strips B. At its other pair of opposed edges, each panel A is supported by short support strips (not shown), each of which extends between an adjacent pair of the strips B.

Each strip B is adhesively secured to a support bar G, which is suspended from an original ceiling H by a series of wires I.

Along each wall of the room is a series of cornices E which are suspended by means of interengaging channel strips respectively secured to the wall and each cornice. The cornices are disposed at a vertical location below that of the panels A and strips B and themselves assist in supporting margin pieces D and bulkheads C, which are adhesively secured together. Wedges K are engaged between the wall and the margin pieces D.

Figure 5:
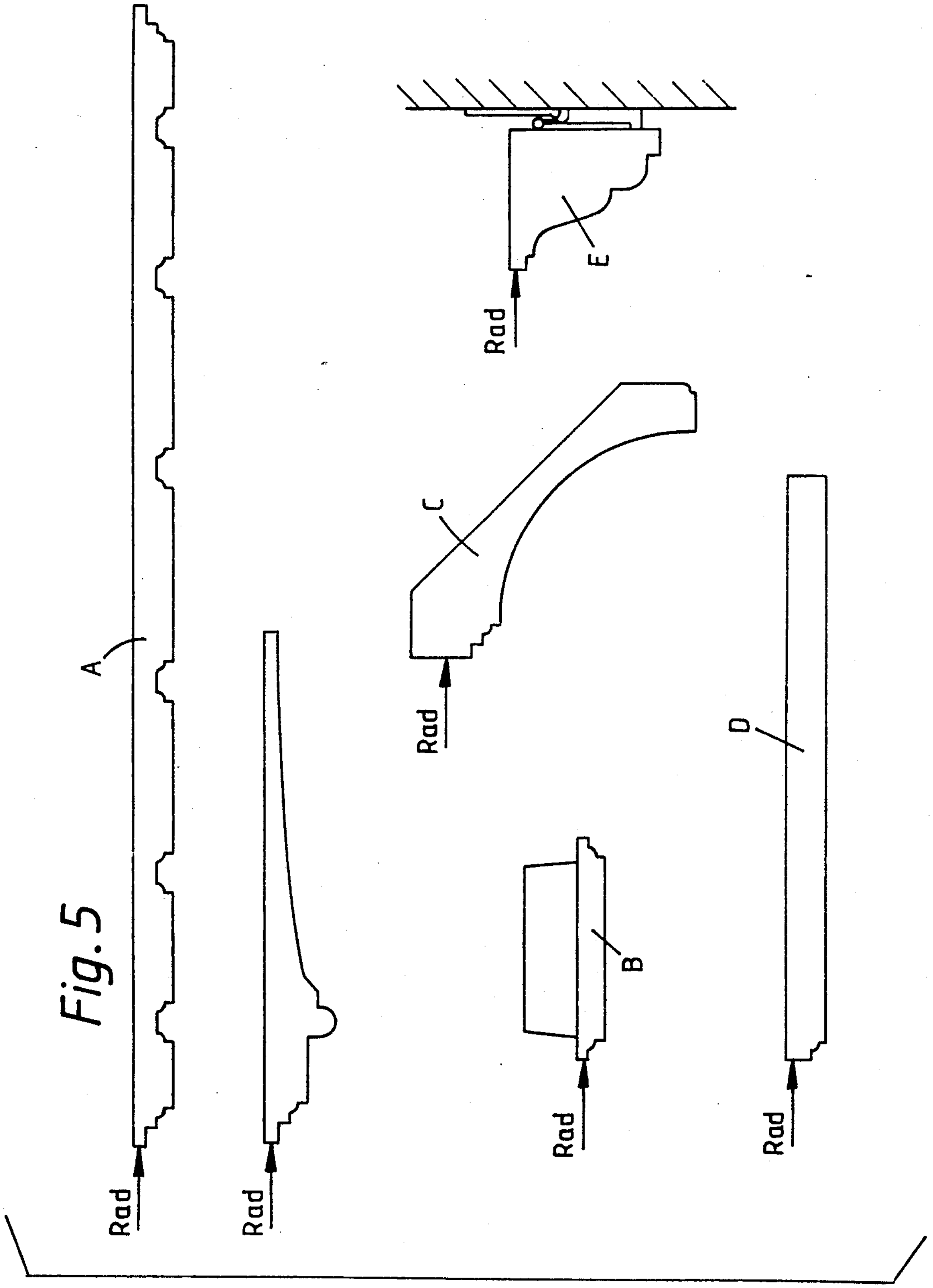
FIG. 5 shows components in the ceiling of FIG. 4 in greater detail.

The components A to E of FIG. 4 are shown in more detail in FIG. 5. Each component is made from an original sheet or block, the decorative finish on the panels A, the shaping of the edges of the strips B and margin pieces D, and the overall sectional shape of the cornices E and bulkheads C being produced by shaping in the apparatus of FIG. 1.

It will be appreciated that a method according to the invention can be carried out with the body stationary and the tool movable relative to the body. In this case the tool may be movable in three dimensions relative to the body.

We claim:

1. A method of shaping a body of rigid foamed friable material having individual cells suitable for use in the building or furnishing industry, said method comprising:

engaging a surface region of the body with a tool having a working end with a predetermined profile corresponding to the profile to be formed in said surface region; and with said body in a rigid state, effecting relative movement between the body and the tool in a direction generally parallel with the surface of said region and generally normal to the working end of the tool, and thereby removing material from said surface region of said body by crumbling individual cells of said rigid foamed material which lie directly in the path of the tool and breaking or snapping off cells at the edge of the path;

said body being of rigid foamed material which is sufficiently friable when engaged by the tool during the relative movement to be removed from the body but sufficiently rigid so that adjacent material not engaged by said tool remains;

whereby said surface region is formed with a recess having a profile corresponding to the predetermined profile of the tool.

2. The method of claim 1, wherein said surface region is a material comprising resins which are at least partially cured or plaster in a set or dried condition; said plaster comprising gypsum, water and sand, perlite or pumice.

3. The method of claim 1, wherein said surface region is formed of material selected from the group consisting of foamed plastic materials and foam glass.

4. The method of claim 1, wherein said surface region is formed of a foamed phenolic resin composition obtained by causing or allowing a mixture of phenolic resole, acid hardener and finely divided particulate solid to cure under conditions in which foaming of the mixture is caused primarily or solely by volatilization of small molecules present in the resole or formed as a by-product of the curing reaction.

5. The method of claim 4, wherein said foamed phenolic resin composition has a density in the range of 100 to 500 $kg/m^3$.

6. The method of claim 1, in which a desired profile of the recess is achieved in a series of stages with the depth of the recess being increased at each stage.

7. The method of claim 6, in which a coating is applied to the surface of a profiled recess before the final stage.

8. The method of claim 7 in which further profiling of the surface region is effected by embossing.

9. A method as claimed in claim 6 wherein in at least the first stage, the tool has a toothed profile or is formed of a series of laterally spaced tooth elements, each element being formed as a tooth or pin.

10. A method of shaping a body formed of rigid foamed friable plastic material having individual cells and suitable for use in construction, consisting essentially of:

providing a tool having a working end with a predetermined profile corresponding to a profile to be formed along a generally planar surface of said body, said tool comprising a plurality of pin-like elements having distal ends arranged in said predetermined profile, said distal ends constituting means for fracturing and crumbling individual cells of said rigid foamed material; and effecting relative movement between said tool and body, while said body is in a rigid state, in a direction parallel with said surface of said body and in a direction perpendicular to said distal ends of said tool to thereby remove material from said surface of said body by crumbling individual cells of said rigid foamed material which lie directly in the path of said distal ends of said tool by fracturing cells from said body which come in contact with the distal ends of said tool, said body being formed of a material which is sufficiently friable when engaged by said tool during said relative movement to be removed from the body but sufficiently rigid so that adjacent material not engaged by said tool remains;

whereby said profile is formed in said surface of said body in a single pass.

* * * * *